Feb. 4, 1969 C. J. HOWARD ET AL 3,425,795
METHOD FOR PREPARING SUPERDENSE SODIUM CARBONATE FROM
WYOMING TRONA AND THE PRODUCT THEREOF
Original Filed March 8, 1965 t:w RATIOS ABOUT
2:3 TO 2:4 a = AXIS IN THICKNESS
DIRECTION

INVENTORS:
CARLTON J. HOWARD
EUGENE B. PORT
BY
Richard P. Vila
ATTORNEY

United States Patent Office 3,425,795
Patented Feb. 4, 1969

3,425,795
METHOD FOR PREPARING SUPERDENSE SODIUM CARBONATE FROM WYOMING TRONA AND THE PRODUCT THEREOF
Carlton J. Howard, Salina, and Eugene B. Port, Solvay, N.Y., assignors to Allied Chemical Corporation, New York, N.Y., a corporation of New York
Original application Mar. 8, 1965, Ser. No. 437,809, now abandoned. Divided and this application Aug. 9, 1966, Ser. No. 571,362
U.S. Cl. 23—63                7 Claims
Int. Cl. C01d 7/36

ABSTRACT OF THE DISCLOSURE

A method is provided for preparing high density, super dense anhydrous sodium carbonate from Wyoming trona by a process which comprises calcining the trona; reducing the calcined trona to a particle size of less than about 80 mesh; forming sodium carbonate monohydrate crystals larger than 80 mesh, but less than 10 mesh; separating the water-insoluble particles of a size less than 80 mesh and converting the sodium carbonate monohydrate crystals, preferably in the presence of 20% to 30% of potassium carbonate, to anhydrous sodium carbonate by holding the sodium carbonate monohydrate solution at a temperature from 1–6° C. above the transition temperature of the solution and then separating the anhydrous sodium carbonate crystals characterized as having a pseudohexagonal shape from the solution.

---

This is a division of copending application Ser. No. 437,809, filed on Mar. 8, 1965, and now abandoned.

This invention relates to dense soda ash and particularly refers to an economical method for manufacture from crude trona of a grade having suitable physical properties for glass usage.

A major portion of dense ash is manufactured for use in the glass industry. The primary requirements of the glass industry are for dense material which will not dust, is free-flowing and of a particle size to make it compatible with the sands used. Absolute purity of the soda ash is not required as long as the impurities, such as silica and calcium compounds, are those normally added with the ash to make glass. Free-flowing soda ash is required to facilitate handling in unloading, transfer to storage and through automatic weighing facilities. There must be little or no dust during handling to avoid irritation to workers and during addition to the melting furnaces to avoid transfer of sodium carbonate to the furnace checker work which causes a decrease in furnace life.

The trona deposits in Sweetwater and adjacent counties in Wyoming are found at a depth of about 1500 feet underground and consist of a main trona bed varying from 8 to 10 feet in thickness and many smaller veins of lesser thickness. The trona consists mainly of sodium sesquicarbonate ($Na_2CO_3 \cdot NaHCO_3 \cdot 2H_2O$) with about 3–15% or more, generally 5–10% of insoluble impurities, mainly shale. There are relatively little soluble impurities in the trona. Two compositions of the crude trona from the main bed vary but the following may be typical of the range (calcined basis).

|  | Percent | |
| --- | --- | --- |
| $Na_2CO_3$ | 95.6 | 90.0 |
| Water insoluble | 4.10 | 9.3 |
| NaCl | 0.11 | 0.12 |
| $Na_2SO_4$ | 0.06 | 0.03 |
| $Fe_2O_3$ | 0.13 | 0.20 |
| Organic Matter |  | 0.42 |

Crude trona itself cannot be directly used in glass manufacture since it is of variable composition and would tend to cause variations in the $Na_2O$ content of the glass batch; its freight rate would be too high for the amount of contained alkali and on introduction to the glass batch large amounts of water vapor and carbon dioxide would be evolved tending to form bubbles or other undesirable inclusions in the glass. Calcining the crude trona to impure soda ash would remove some of the objections above but would in turn introduce others. Calcination would remove the volatile water and carbon dioxide of the trona but in so doing would decrease the average particle density so that the resulting product would have poor flow qualities and would be extremely dusty. Its bulk density would be low which would be objectionable during storage prior to compounding in the glass batches. Calcining would tend to give only minor leveling of differences in composition due to inclusions of variable amounts of impurities.

Other processes have been employed to produce dense soda ash but they present difficulties. In the sesquicarbonate process for producing soda ash from trona, the trona is mined, brought to the surface, crushed to about minus 8 mesh particle size and dissolved in a hot, recirculating trona mother liquor carrying more normal carbonate than bicarbonate so that the sodium carbonate and bicarbonate in the mined trona are both dissolved; the insoluble material is settled out of the solution in clarifiers, the remainder of the insoluble material is removed by filtration, sodium sesquicarbonate is crystallized and separated from the hot solution and calcined to soda ash and the mother liquor remaining after the crystallization is reheated and returned to the dissolving tanks to dissolve more trona and again go through the recovery cycle.

This processing route encounters several drawbacks: need for maintaining the carbonate-bicarbonate ratio in the recycling mother liquor; relatively low concentrations of salts per unit of solution, thus requiring large processing equipment to recover the sesquicarbonate; and need for addition of sequestrants during filtration and crystallizing aids during crystallization to obtain desirable particles. These later contaminate the product.

In the usual monohydrate route for processing trona to soda ash, the trona is mined, brought to the surface, crushed to ½″, calcined at temperatures over 500° C., dissolved, clarified and filtered. The clear liquor is evaporated to form sodium carbonate monohydrate which is removed by filtration. Mother liquor is diluted and returned to dissolve more crude soda, and the monohydrate crystals are calcined to dense ash. This route for producing dense ash for use in glass manufacture has some drawbacks, among them being the heavy evaporation load with associated high capital costs of boilers and evaporation.

It is desirable to produce by economical means anhydrous sodium carbonate that is as hard as possible and has a density as high as possible. The higher the density of the anhydrous sodium carbonate, the easier it will flow and the less dusty it will be. Conventional dense anhydrous sodium carbonate produced by calcining sodium carbonate monohydrate has a bulk density of about 950 to 1050 g.p.l. An extremely high density, "superdense" anhydrous sodium carbonate can be produced under the method that constitutes the present invention. By dissolving a substantial amount of potassium salts in the recrystallizing solution superdense anhydrous sodium carbonate is formed, since the presence of these salts is an important factor in increasing the density of the anhydrous sodium carbonate crystals that are formed. The superdense anhydrous sodium carbonate product thus formed has a bulk density of about 1200 to 1400 g.p.l.

An object of the present invention is to provide an efficient economical method for preparing anhydrous sodium carbonate having good physical properties, especially for use in the glass industry, from crude Wyoming trona.

Another object of the present invention is to obtain superdense anhydrous sodium carbonate from crude Wyoming trona.

Other objects and advantages will be apparent from the following description and accompanying drawings.

In accordance with the present invention crude Wyoming trona containing substantial amounts of water-insoluble impurities (3–15%, generally 5–10%) may be treated in an economical method without first removing the water-insoluble impurities from the crude trona to produce good quality dense soda ash containing less than 1%, generally less than 0.5% water-insoluble impurities, by calcining the crude Wyoming trona at a temperature from above about 200° C. to about 600° C., preferably at a temperature from 200 to about 400° C., to convert the crude trona into crude sodium carbonate; reducing the thus calcined sodium carbonate to essentially all less than 80 mesh, preferably minus 100 mesh size, i.e., at least 97% passing through an 80 mesh screen (Tyler); introducing the thus fine-ground calcined sodium carbonate, preferably at a temperature of about 100–150° C., into a crystallizing zone containing an aqueous slurry of water-insoluble impurities and sodium carbonate monohydrate crystals; maintaining said slurry at a temperature of about 65° C. to about 108° C., preferably 92–97° C., under substantially nonevaporative conditions to form sodium carbonate monohydrate crystals larger than the feed size and less than 10 mesh, preferably from about 20 to 60 mesh size; withdrawing aqueous slurry from the crystallizing zone containing water-insoluble impurities smaller than 80 mesh, preferably smaller than 100 mesh, and sodium carbonate monohydrate crystals larger than the feed size and less than 10 mesh, preferably larger than 100 mesh and less than 20 mesh; separating the sodium carbonate monohydrate crystals larger than the feed size and less than 10 mesh, preferably larger than 100 mesh and less than 20 mesh, preferably by passing clarified mother liquor upwardly countercurrent to downwardly moving aqueous slurry withdrawn from the crystallizing zone to effect separation of the sodium carbonate monohydrate crystals larger than the feed size and less than 10 mesh, preferably larger than 100 mesh and less than 20 mesh, which are removed at the bottom from the water-insoluble impurities smaller than 80 mesh, preferably smaller than 100 mesh, which are removed from the top together with sodium carbonate monohydrate crystals smaller than 80 mesh, preferably smaller than 100 mesh; and maintaining the temperature within the separating zone between about 60–95° C., preferably about 70–90° C., by introducing heated mother liquor at a sufficiently high temperature to maintain the desired temperature in the separating zone; separating water-insoluble impurities from the mother liquor discharged from the top of the separating zone, preferably adding water to said mother liquor containing the water-insoluble impurities before separation in an amount sufficient to dissolve the small crystals of sodium carbonate monohydrate contained in the mother liquor; preferably separating a portion of the mother liquor from the slurry of the sodium carbonate monohydrate crystals in mother liquor discharged from the bottom of the separating zone and returning said separated mother liquor to the crystallizing zone; introducing the slurry of sodium carbonate monohydrate crystals in mother liquor into a conversion zone containing an aqueous slurry of anhydrous sodium carbonate crystals held at a temperature 1 to 6° C., preferably 2 to 4° C. above the transition temperature at which monohydrate changes to anhydrous sodium carbonate, and desirably also containing about 20–30% by weight of dissolved $K_2CO_3$; maintaining the monohydrate crystals in the conversion zone until substantially completely converted to anhydrous sodium carbonate crystals; withdrawing an aqueous slurry from the conversion zone; separating anhydrous sodium carbonate crystals from mother liquor; and returning said last-named separated mother liquor to the process.

Additional salts may be present in the conversion zone liquor to aid in lowering the conversion or transition temperature from the monohydrate to the anhydrous sodium carbonate. Examples of such salts are NaCl, KCl, $K_2CO_3$ and mixtures of these. If potassium salts are present, the mother liquor remaining after separation of anhydrous sodium carbonate crystals may desirably be returned to the conversion zone and excess accumulated water may be removed by evaporation from the conversion zone, such as, for example, by boiling under a fixed pressure required to maintain the desired temperature in said conversion zone. Such a procedure avoids loss of potassium values in the insoluble muds removed from the separation zone following the monohydrate crystallization zone. This loss would result if the conversion zone mother liquor were returned to the monohydrate crystallizing zone.

The transition temperature for a given mother liquor may be determined by a series of test involving the addition of a mixture of monohydrate and anhydrous sodium carbonate crystals to solutions of the mother liquor held at various temperatures. The temperature at which there is no decrease or increase in the amount of either crystal form will be the transition temperature.

The accompanying drawings diagrammatically illustrate the present invention.

Figure 1:
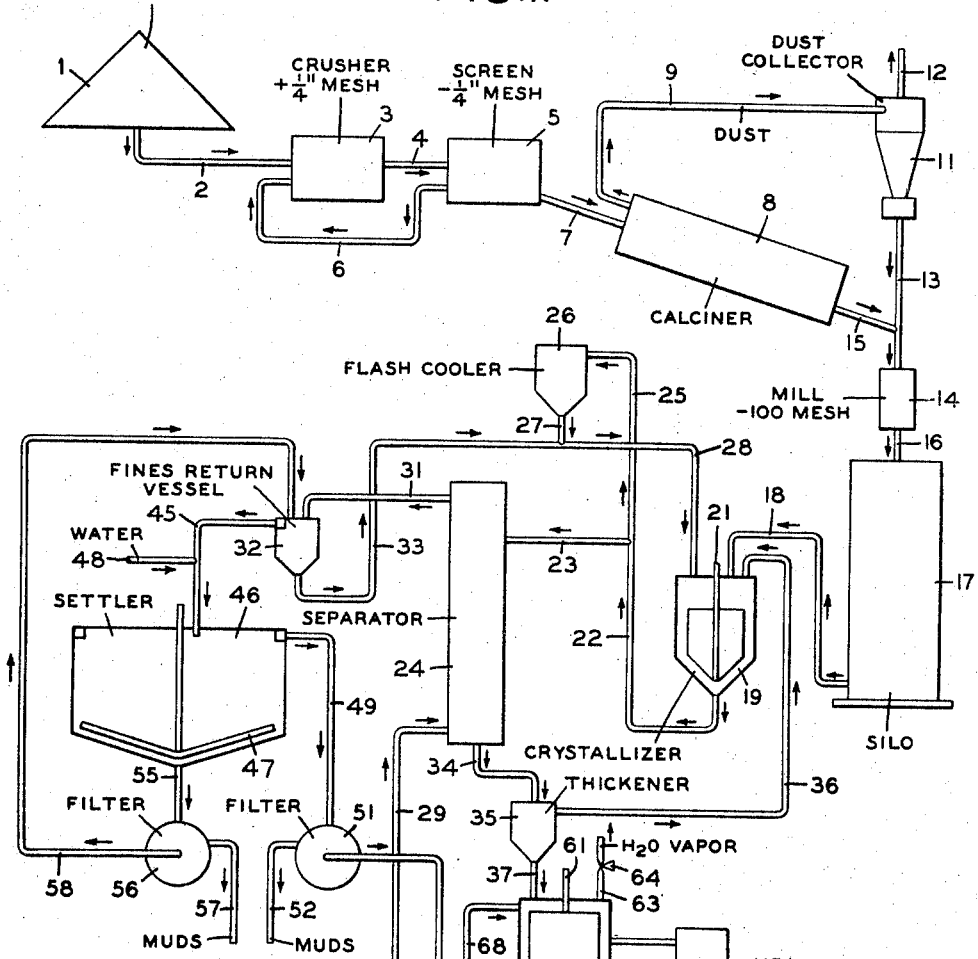
FIGURE 1 is a diagrammatic flow sheet of the process that constitutes the invention.

Referring to FIGURE 1, crude trona is supplied to stockpile 1 by conventional mining methods. The trona is transferred through line 2 to crusher 3 to reduce the crude trona to about ¼" mesh size. The crushed trona is then conveyed through line 4 onto screen 5 and oversized particles, i.e., particles which are retained on a ¼" mesh screen, are returned via line 6 to crusher 3. Thus the crushing and screening reduces the crude trona to essentially all minus ¼" mesh size to provide a suitable feed passing through line 7 to calciner 8.

Calcination of the crude trona may be accomplished in any suitable equipment. Typically, a direct fired, countercurrent flow, rotary calciner would be effective in calcining the crude trona to a crude $Na_2CO_3$. Although calcination of the crude trona can be carried out at a temperature up to about 600° C., it was found that a product with satisfactory purity would be obtained at a temperature within the range of 200–400° C. This has the advantage of reducing the loss of soda due to solubilization with calcium, aluminum and silica under high temperature calcination. However, calcination temperatures in excess of 400° C. may be employed if it is desired to produce a special product with minimized amount of organic carbon. Dust removed from calciner 8 by the passage of hot gases is removed through line 9 and collected in dust collector 11 wherein the dust settles to the bottom and the gases separated from the dust are discharged through line 12. The amount of dust and its composition are governed by size of feed and the gas velocity in calciner 8, but at 5 feet per second velocity, the amount is about 5–15% of the feed. Return of dust to the calciner is objectionable since due to its light character it would tend to be blown out again. It is, instead, added through line 13 to mill 14 to be ground and passed on to the other processing steps.

The calcined trona discharges from calciner 8 through line 15 into mill 14 where the crude soda ash from the calciner is then ground to essentially all minus 100 mesh. This minus 100 mesh particle size is important in the processing steps that follow because it contributes to more efficient crystallization and eventual separation of crystals from insolubles. The fine ground crude soda ash flows from mill 14 through line 16 into silo 17. The solids from silo 17 consisting of calcined crude trona containing about 5–10% water-insolubles and of a particle size less than 100 mesh is introduced preferably at a temperature of 100–150° C. through line 18 into crystallizer 19 containing an aqueous slurry of water-insoluble impurities and sodium carbonate monohydrate crystals. The crystallizer may be a paddle type, agitated and baffled crystallizer. The aqueous slurry of water-insoluble impurities and sodium carbonate monohydrate crystals in crystallizer 19 is maintained at a temperature of about 65° to about 108° C., preferably 92–97° C., under substantially non-evaporative conditions to form sodium carbonate monohydrate crystals larger than 100 mesh and preferably larger than about 60 mesh. Due to the introduction of solid crude calcined sodium carbonate entering through line 18, the concentration of sodium carbonate in the liquor in the crystallizer is increased and while some small amount of water, less than 10% and generally no more than 2–3%, may evaporate from crystallizer 19, the temperature of the liquor in the crystallizer is maintained below the boiling point to retard evaporation. The contents of crystallizer 19 are agitated by means of paddle 21 which maintains the crystals of sodium carbonate and water-insoluble impurities dispersed and suspended in the liquor. The impurities present average about 5–6% of the crude $Na_2CO_3$ and are present largely as insoluble materials.

The crude soda ash fed to the crystallizer should be substantially all minus 100 mesh. When the feed material particle size is larger than 100 mesh, the conversion rate to monohydrate decreases as the particle size increases. In addition, as the particle size increases, more and larger agglomerates are formed in the crystallizer. Another reason for minus 100 mesh feed is to aid in more efficient monohydrate crystal separation from the muddy mother liquor. Since the monohydrate crystals formed in this process are predominantly plus 100 mesh, if the feed material including the insolubles is minus 100 mesh, then the crystals are more readily separated from the finer particle insolubles. A slurry containing about 30–60% soilds consisting principally of large crystals of sodium carbonate monohydrate, water-insoluble impurities and some small crystals of less than 100 mesh size of sodium carbonate monohydrate are withdrawn from the bottom of crystallizer 19 through line 22 and passed through line 23 into separator 24. The temperature in the crystallizer may be controlled by the heat input of the entering materials or by indirect cooling with a liquid medium or by passing some of the slurry through line 25 into flash cooler 26 maintained at a pressure below crystallizer 19 whereby some water is evaporated and the cooled body of slurry discharged through line 27 and returned through line 28 to crystallizer 19. Separation of the greater than 100 mesh sodium carbonate monohydrate crystals from the muddy mother liquor may be accomplished in a number of ways such as wet screening, selective wet centrifugation, or by using elutriation techniques. Referring to the drawing the muddy mother liquor entering through line 23 is introduced at a point below the top of column 24 and passes downward through separator 24 countercurrent to clarified mother liquor entering through line 29 and passing upwardly from a point near the bottom of separator 24. As a result of this countercurrent flow the larger particles of sodium cabonate monohydrate crystals continue their passage downward through column 24 and the finer particles of water-insoluble impurities are retarded in their downward passage and moved upwardly through separator 24 and out from the top of separator 24 through line 31 into fines return vessel 32. Some crystals of sodium carbonate monohydrate are carried over with the muddy mother liquor and to some extent settle in the fines return vessel 32 and are returned via lines 33 and 28 to crystallizer 19. Separation is effectively accomplished at a temperature between about 60–95° C., preferably 70–90° C., and this temperature can be controlled by regulating the temperature of the incoming clarified mother liquor entering through line 29.

The slurry at the bottom of separator 24 from which fine particles of water-insoluble impurities and fine crystals of sodium carbonate monohydrate have been removed is discharged through line 34 into thickener 35. Relatively clear mother liquor overflows from the top of thickener 35 and is returned through line 36 to crystallizer 19. The thickened slurry of crystals is sent through line 37 to converter 59 wherein the monohydrate crystals are converted to anhydrous sodium carbonate. The slurry in converter 59 contains 5 to 60%, preferably 25 to 50%, suspended anhydrous sodium carbonate crystals in mother liquor at a tempere which is 1 to 6° C., preferably 2 to 4° C., above the transition temperature for converting sodium carbonate monohydrate to anhydrous sodium carbonate in the mother liquor being used. Temperatures higher than about 6° C. above the transition temperature tend to give poorer quality anhydrous crystals containing high fines and having low resistance to abrasion. Heater 62 is used to maintain this temperature. The converter may be a paddle agitated type with baffles. Paddle 61 maintains the crystals of both types thoroughly mixed and dispersed in mother liquor.

The aqueous slurry containing anhydrous sodium carbonate is discharged through line 65 to thickener 66. Relatively clear mother liquor overflows from the top of thickener 66 and is returned through line 68 to converter 59. The thickened slurry of crystals is sent through line 67 to centrifuge 38 wherein the crystals are separated from the mother liquor. The mother liquor is directed through line 39 to storage tank 41 and the centrifuged crystals are sent through line 42 to dryer 43. The dryer may be a conventional rotary type wherein the thin film of solution surrounding the anhydrous sodium carbonate crystals is dried at a temperature of 150 to 200° C. to give anhydrous crystals free of any surface film of adherent solution.

When salts in addition to $Na_2CO_3$ are dissolved in the mother liquor, e.g., $K_2CO_3$ or KCl, the mother liquor from centrifuge 38 may be recycled directly to converter 59 via dotted line 70 and line 68. In such cases, accumulated water from the system is removed by adding additional heat via heater 62 and drawing off water vapor from the converter through line 63 and valve 64 which is controlled to give the desired relatively constant temperature in the converter. Vacuum may be applied to the discharge side of valve 64 if necessary. The amount of valuable salts, such as $K_2CO_3$ or KCl, carried out with the anhydrous sodium carbonate crystals may be kept to a small value by adding a small amount of wash water to the centrifuge. This wash water is collected with mother liquor and recycled back to the converter.

Figure 2:
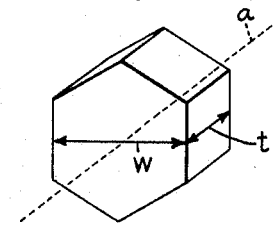
FIGURE 2 is a drawing of a typical crystal of anhydrous sodium carbonate produced by one variation of the process that constitutes the invention.

The presence of 20 to 30%, preferably 23 to 27% of $K_2CO_3$ in the converter mother liquor is useful in promoting formation of pseudohexagonal crystals as shown in FIGURE 2 of considerable thickness and having well-defined edges between faces. These crystals have high bulk densities of the order of 1200 to 1400 grams per liter and can be made in mesh sizes well suited to glass manufacture. The presence of less than about 20% $K_2CO_3$ in the converter mother liquor promotes formation of tabular crystals of lower bulk density while the presence of greater than about 30% $K_2CO_3$ promotes formation of longer rod-like crystals having pseudohexagonal faces on the ends and also having lower bulk densities.

Overflow from fines return vessel 32 containing water-insoluble impurities and sodium carbonate monohydrate crystals of less than 100 mesh size pass through line 45 into settler 46 which may be of conventional design employing a rotating rake 47. Although the system is of the nonevaporative type there is nevertheless some loss of water due to losses of liquid adhering to the crystals entering dryer 43, losses of water due to evaporation in converter 59, losses due to leakage, and losses due to evaporation of water from open vessels. The amount of makeup water in this system is only a fraction of that required by the evaporative type systems wherein crude trona is dissolved in water and crystallization is accomplished primarily by evaporation. It is beneficial to introduce the makeup water into the muddy mother liquor prior to or during separation of the muds from the mother liquor as shown in the drawing wherein makeup water is introduced through line 48. The reason for this is that the muddy mother liquor contains small crystals of sodium carbonate monohydrate and this sodium carbonate unless dissolved by means of introduction of water may be discarded with the separated muds.

From the top of settler 46 the nearly clear settled liquor overflows through line 49 to filter 51 wherein the muds are separated and discharged through line 52 and the filtrate sent through line 53 to mother liquor storage tank 41. The temperature of the mother liquor may be maintained by means of heater 54. Additional muds are removed from the bottom of settler 46 and sent through line 55 to filter 56 from which the separated muds are discharged through line 57 and the filtrate sent via line 58 to fines return vessel 32.

The following examples illustrate the present invention.

EXAMPLE I

Mined crude Wyoming trona in lump form was reduced in a jaw crusher to all minus ¼″ size. The crushed material was then calcined in a rotary dryer with smooth walls and no flights to 400° C. The calcined crude trona analyzed as follows:

| | |
|---|---|
| $Na_2CO_3$ | 93.9 |
| Water insoluble | 5.40 |
| NaCl | 0.11 |
| $Na_2SO_4$ | 0.05 |
| $Fe_2O_3$ | 0.17 |
| Organic matter | 0.37 |

The crude soda ash (calcined trona) was then ground to a powder in an attrition mill. No effort was made to grind the material to any specific screen size fraction but it was essentially all minus 100 mesh.

For purposes of initiating the operation, a synthetic crystallizing medium was prepared by dissolving a portion of the above powdered calcined trona in distilled water to make approximately a 30% Na2CO3 solution containing about 5% insolubles on the basis of the crude calcined trona. The insolubles were then filtered out of this solution and the resulting clear solution was then used as a starting crystallizer solution. The clear solution was introduced into a crystallizer equipped with an anchor-shaped paddle operated at about 200 r.p.m., a powder feed funnel, a mother liquor feed tube and a slurry withdrawal tube. Crude calcined powdered trona at a temperature of about 120° C. was fed into the feed funnel of the crystallizer maintained at 95° C. The feed was continued until there was about 50–60% solids by weight of the slurry. Slurry was withdrawn from the crystallizer through the withdrawal tube and the slurry introduced into an elutriation column equipped with a bottom inlet and a top outlet. Clarified mother liquor was introduced in the bottom of the elutriation column passing upwardly countercurrent to the slurry from the crystallizer. Muddy mother liquor from the top of the elutriation column was passed to a mud settler wherein makeup water was added. The muds were filtered and sent to waste and the filtered mother liquor together with makeup water went to storage and was recycled to the crystallizing system.

From the bottom of the elutriation column was withdrawn a slurry containing large crystals of sodium carbonate monohydrate.

Three hundred parts of sodium carbonate monohydrate crystals were added via a pressure lock over a 30-minute period to a well-agitated slurry composed of 1000 parts of saturated sodium carbonate solution and 50 parts of anhydrous sodium carbonate seed crystals of −80 +200 mesh size, said slurry being at 110 to 112° C. and contained in a vessel under sufficient pressure to prevent boiling. The mixture was held at this temperature for an additional 30 minutes. This temperature was about 1 to 3° C. above the transition temperature for converting sodium carbonate monohydrate to anhydrous sodium carbonate in saturated aqueous $Na_2CO_3$ solution containing essentially no additional dissolved salts. The solids were then separated quickly from mother liquor and dried. The bulk density of these crystals was 1250 g.p.l. which is about 300 g.p.l. heavier than commerical dense soda ash. Flow quality was good. Resistance to abrasion was 1.3% loss in an abrasion test as comapred with about 5% loss shown by conventional commercial dense soda ash made from sodium carbonate monohydrate. Examination of photomicrographs of the crystals showed them to be largely single anhydrous crystals.

The abrasion test is performed by shaking 20 grams of −20 +100 mesh material with 50 grams of 5 mm. diameter glass beads on a 100 mesh screen on a standard Rotap sieve shaking machine for 10 minutes. The amount of −100 mesh material generated is a measure of the abroaded material produced and is expressed on a percentage basis. The greater the number, the poorer is the resistance to abrasion.

EXAMPLE II

This experiment was made in the same manner as Example I except that the temperature in the conversion vessel was held at 115 to 116° C. The bulk density of the crystals obtained was 1160 g.p.l. Resistance to abrasion was very poor with 10.1% loss in the abrasion test. Examination of photomicrographs of the product showed it to be composed of agglomerates of small crystals of anhydrous sodium carbonate formed within the skeleton framework of the original monohydrate crystals. Such crystals have a lower bulk density and are more fragile than the type of crystals made in Example I.

EXAMPLE III

This experiment was carried out in essentially the same manner as Example I except that the aqueous mother liquor in the conversion vessel contained 25% $K_2CO_3$ in solution and was saturated with respect to $Na_2CO_3$. There was no need to operate under pressure. The temperature was held at 97 to 100° C. for 105 minutes and at 101° for an additional 15 minutes to complete the conversion of monohydrate to anhydrous sodium carbonate. The transition temperature in this liquor was about 93–94° C.

The dried crystals of anhydrous sodium carbonate were of a pseudohexagonal type with a thickness to width ratio of 2:3 to 2:4, the width being measured between opposite sides on the hexagon face. An imaginary center line in the thickness direction was estimated to form a minimum angle with the hexagon face of about 77°. In a true hexagonal type crystal this angle would be 90°. The bulk density was 1300 g.p.l. The flow quality was good. Resistance to abrasion was 0.5% loss which is excellent. Granulation was of a size well suited to glass manufacture. The well-defined edges between faces on the crystals would help prevent segregation due to rolling when incorporated in a raw material mix for glass formation. FIGURE 2 illustrates the basic form of the crystals produced in this experiment.

EXAMPLE IV

This experiment was made in the same manner as that of Example III except that the temperature in the converter was held at 107–109° C. for a total of 45 minutes, and the monohydrate was added within 24 minutes. Conversion was substantially complete in 25 minutes. The product was not as desirable as that of Example III. Much of the converted crystals were agglomerates of small crystals of anhydrous sodium carbonate formed within the skeleton framework of the original monohydrate crystals. Density was only 1100 g.p.l. The crystals showed 2.5% loss in the abrasion test.

Although certain preferred embodiments of the invention have been disclosed for purpose of illustration, it will be evident that various changes and modifications may be made therein without departing from the scope and spirit of the invention.

We claim:

1. Anhydrous superdense sodium carbonate product composed essentially of pseudohexagonal shaped crystals having (a) thickness:width ratios between about 2:3 and 2:4, said width being measured between opposite edges on the hexagonal faces, (b) a minimum angle of about 77° formed between the central axis of the thickness direction and the hexagonal faces, (c) a bulk density between 1200 and 1400 grams per liter, and (d) a resistance to abrasion of less than about 5% loss.

2. A process for production of anhydrous superdense sodium carbonate product composed of pseudohexagonal shaped crystals which comprises (a) introducing an aqueous slurry of sodium carbonate monohydrate crystals greater than about 100 mesh into a recrystallizing zone containing 25 to 50% anhydrous sodium carbonate crystals suspended in a liquor held at 97 to 101° C. containing 20 to 30% dissolved $K_2CO_3$ and being saturated with respect to sodium carbonate; (b) maintaining the monohydrate crystals within the recrystallizing zone at 97 to 101° C. until converted to anhydrous sodium carbonate and recovering the anhydrous sodium carbonate crystals from the recrystallization zone mother liquor, said crystals being characterized by a pseudohexagonal shape having (a) thickness:width ratio between 2:3 and 2:4, said width being measured between opposite edges on the hexagonal faces, (b) a minimum angle of about 77° formed between the central axis of the thickness direction and the hexagonal faces, and (c) a bulk density between 1200 and 1400 grams per liter.

3. A process for the treatment of crude Wyoming trona containing substantial amounts of naturally occurring water-insoluble impurities to produce good quality anhydrous, superdense sodium carbonate crystals free from most of said water-insoluble impurities which comprises (a) calcinating the crude Wyoming trona at a temperature within the range of about 200°–600° C. to convert the crude trona into crude sodium carbonate; (b) reducing the thus calcined crude trona to essentially all less than 80 mesh size; (c) introducing the thus fine ground calcined trona containing the naturally occurring water-insoluble impurities into an aqueous slurry of water-insoluble impurities and sodium carbonate monohydrate crystals in a crystallizing zone; (d) maintaining said slurry at a temperature of about 65° C. to about 108° C. under substantially non-evaporative conditions to form sodium carbonate monohydrate crystals larger than the feed size and less than 10 mesh size; (e) withdrawing from the crystallizing zone an aqueous slurry containing sodium carbonate monohydrate crystals larger than the feed size and less than 10 mesh and water-insoluble impurities smaller than 80 mesh; (f) separating sodium carbonate monohydrate crystals larger than the feed size and less than 10 mesh in mother liquor from water-insoluble impurities smaller than 80 mesh in mother liquor; (g) introducing the slurry of sodium carbonate monohydrate crystals larger than the feed size and less than 10 mesh in mother liquor into a recrystallizing zone containing 5 to 60% anhydrous sodium carbonate crystals suspended in moth liquor maintained at 1 to 6° C. above the transition temperature at which sodium carbonate monohydrate changes to anhydrous sodium carbonate in said mother liquor; (h) maintaining the monohydrate crystals within the recrystallizing zone until converted to anhydrous sodium carbonate; and (i) recovering the anhydrous sodium carbonate crystals from the recrystallization zone mother liquor.

4. A process for the treatment of crude Wyoming trona containing substantial amounts of naturally occurring water-insoluble impurities to produce good quality anhydrous, superdense sodium carbonate crystals free from most of said water-insoluble impurities which comprises (a) calcining the crude Wyoming trona at a temperature within the range of about 200–400° C. to convert the crude trona into crude sodium carbonate; (b) reducing the thus calcined crude trona to essentially all less than 10 mesh size; (c) introducing the thus fine ground calcined trona containing the naturally occurring water-insoluble impurities at a temperature of about 100–150° C. into an aqueous slurry of water-insoluble impurities and sodium carbonate monohydrate crystals in a crystallizing zone; (d) maintaining said slurry at a temperature of about 92–97° C. under substantially nonevaporative conditions to form sodium carbonate monohydrate crystals larger than about 100 mesh size with crystals predominantly within the range from about 20 to 60 mesh size; (e) withdrawing from the crystallizing zone an aqueous slurry containing sodium carbonate monohydrate crystals greater than about 100 mesh and water-insoluble impurities smaller than about 100 mesh; (f) separating sodium carbonate monohydrate crystals greater than about 100 mesh in mother liquor from water-insoluble impurities smaller than about 100 mesh in mother liquor; (g) introducing the slurry of sodium carbonate monohydrate crystals greater than about 100 mesh in mother liquor into a recrystallizing zone containing 25 to 50% anhydrous sodium carbonate crystals suspended in a mother liquor maintained at 2 to 4° C. above the transition temperature at which sodium carbonate monohydrate changes to anhydrous sodium carbonate in said mother liquor; (h) maintaining the monohydrate crystals within the recrystallizing zone until converted to anhydrous sodium carbonate; and (i) recovering the anhydrous sodium carbonate crystals from the recrystallization zone mother liquor.

5. A process for the treatment of crude Wyoming trona containing substantial amounts of naturally occurring water-insouble impurities to produce good quality anhydrous, superdense sodium carbonate crystals free from most of said water-insoluble impurities which comprises (a) calcining the crude Wyoming trona at a temperature within the range of about 200–400° C. to convert the crude trona into crude sodium carbonate; (b) reducing the thus calcined crude trona to essentially all less than 100 mesh size; (c) introducing the thus fine ground calcined trona containing the naturally occurring water-insoluble impurities at a temperature of about 100–150° C. into an aqueous slurry of water-insoluble impurities and sodium carbonate monohydrate crystals in a crystallizing zone; (d) maintaining said slurry at a temperature of about 92–97° C. under substantially nonevaporative conditions to form sodium carbonate monohydrate crystals larger than about 100 mesh size with crystals predominantly within the range from about 20 to 60 mesh size; (e) withdrawing from the crystallizing zone an aqueous slurry containing sodium carbonate monohydrate crystals greater than about 100 mesh and water-insoluble impurities smaller than about 100 mesh; (f) separating sodium carbonate monohydrate crystals greater than about 100 mesh in mother liquor from water-insoluble impurities smaller than about 100 mesh in mother liquor; (g) introducing the slurry of sodium carbonate monohydrate crystals greater than about 100 mesh in mother liquor into a recrystallizing zone containing 25 to 50% anhydrous sodium carbonate crystals suspended in a mother liquor maintained at 110 to 112° C. and having dissolved therein at least 28% sodium carbonate; (h) maintaining the monohydrate crystals within said recrystallizing zone until converted to anhydrous sodium carbonate; and (i) recovering the anhydrous sodium carbonate crystals from the recrystallization zone mother liquor.

6. A process for the treatment of crude Wyoming trona containing substantial amounts of naturally occurring water-insoluble impurities to produce good quality anhydrous, superdense sodium carbonate crystals free from most of said water-insoluble impurities which comprises (a) calcining the crude Wyoming trona at a temperature within the range of about 200–400° C. to convert the crude trona into crude sodium carbonate; (b) reducing the thus calcined crude trona to essentially all less than 100 mesh size; (c) introducing the thus fine ground calcined trona containing the naturally occurring water-insoluble impurities at a temperature of about 100–150° C. into an aqueous slurry of water-insoluble impurities and sodium carbonate monohydrate crystals in a crystallizing zone; (d) maintaining said slurry at a temperature of about 92–97° C. under substantially nonevaporative conditions to form sodium carbonate monohydrate crystals larger than about 100 mesh size with crystals predominantly within the range from about 20 to 60 mesh size; (e) withdrawing from the crystallizing zone an aqueous slurry containing sodium carbonate monohydrate crystals greater than about 100 mesh and water-insoluble impurities smaller than about 100 mesh; (f) separating sodium carbonate monohydrate crystals greater than about 100 mesh in mother liquor from water-insoluble impurities smaller than about 100 mesh in mother liquor; (g) introducing the slurry of sodium carbonate monohydrate crystals greater than about 100 mesh in mother liquor into a recrystallizing zone containing 25 to 50% anhydrous crystals suspended in a second mother liquor held at 97 to 101° C., said second mother liquor containing 20% to 30% dissolved $K_2CO_3$ and being saturated with respect to sodium carbonate; (h) maintaining the monohydrate crystals within the recrystallizing zone at 97 to 101° C. until converted to anhydrous sodium carbonate; and recovering the anhydrous sodium carbonate crystals from the recrystallization zone mother liquor, said crystals being characterized by a pseudohexagonal shape having (a) thickness:width ratio between 2:3 and 2:4, said width being measured between opposite edges on the hexagonal faces, (b) a minimum angle of about 77° formed between the central axis of the thickness direction and the hexagonal faces, and (c) a bulk density between 1200 and 1400 grams per liter.

7. A process for the treatment of crude Wyoming trona containing substantial amounts of naturally occurring water-insoluble impurities to produce good quality anhydrous, superdense sodium carbonate crystals free from most of said water-insoluble impurities which comprises (a) calcining the crude Wyoming trona at a temperature within the range of about 200–400° C. to convert the crude trona into crude sodium carbonate; (b) reducing the thus calcined crude trona to essentially all less than 100 mesh size; (c) introducing the thus fine ground calcined trona containing the naturally occurring water-insoluble impurities at a temperature of about 100–150° C. into an aqueous slurry of water-insoluble impurities and sodium carbonate monohydrate crystals in a crystallizing zone; (d) maintaining said slurry at a temperature of about 92–97° C. under substantially nonevaporative conditions to form sodium carbonate monohydrate crystals larger than about 100 mesh size with crystals predominantly within the range from about 20 to 60 mesh size; (e) withdrawing from the crystallizing zone an aqueous slurry containing sodium carbonate monohydrate crystals greater than about 100 mesh and water-insoluble impurities smaller than about 100 mesh; (f) separating sodium carbonate monohydrate crystals greater than about 100 mesh in mother liquor from water-insoluble impurities smaller than about 100 mesh in mother liquor; (g) introducing the slurry of sodium carbonate monohydrate crystals greater than about 100 mesh in mother liquor into a recrystallizing zone containing 25 to 50% anhydrous crystals suspended in a second mother liquor held at 97 to 101° C., said second mother liquor containing 20% to 30% dissolved $K_2CO_3$ and being saturated with respect to sodium carbonate; (h) maintaining the monohydrate crystals within the recrystallizing zone at 97 to 101° C. until converted to anhydrous sodium carbonate; and recovering the anhydrous sodium carbonate crystals from the recrystallization zone mother liquor, said crystals being characterized by a pseudohexagonal shape having (a) thickness:width ratio between 2:3 and 2:4, said width being measured between opposite edges on the hexagonal faces, (b) a minimum angle of about 77° formed between the central axis of the thickness direction and the hexagonal faces, and (c) a bulk density between 1200 and 1400 grams per liter.

References Cited
UNITED STATES PATENTS

| | | | |
|---|---|---|---|
| 1,650,244 | 11/1927 | Sundstrom et al. | 23—63 |
| 1,907,987 | 5/1933 | Lynn | 23—63 |
| 2,133,455 | 10/1938 | Keene et al. | 23—63 |
| 2,343,081 | 2/1944 | Pike | 23—63 |
| 3,236,590 | 2/1966 | Sopchak et al. | 23—63 |
| 3,260,567 | 7/1966 | Hellmers et al. | 23—63 |

OSCAR R. VERTIZ, *Primary Examiner.*

G. T. OZAKI, *Assistant Examiner.*

U.S. Cl. X.R.

23—300, 301, 302